United States Patent [19]

MacLaine-Cross

[11] Patent Number: 5,370,859
[45] Date of Patent: Dec. 6, 1994

[54] GROWING SODIUM TYPE X ZEOLITE CRYSTALS

[75] Inventor: Ian L. MacLaine-Cross, Menai, Australia

[73] Assignee: Unisearch Limited, Kensington, Australia

[21] Appl. No.: 940,962

[22] PCT Filed: May 7, 1990

[86] PCT No.: PCT/AU91/00192

§ 371 Date: Jan. 5, 1993

§ 102(e) Date: Jan. 5, 1993

[87] PCT Pub. No.: WO91/17115

PCT Pub. Date: Nov. 14, 1991

[30] Foreign Application Priority Data

May 8, 1990 [AU] Australia .............................. PK 0021

[51] Int. Cl.$^5$ ............................................. C01B 33/34
[52] U.S. Cl. ...................... 423/709; 423/716; 423/DIG. 21
[58] Field of Search ............... 423/709, 716, DIG. 21; 502/79

[56] References Cited

U.S. PATENT DOCUMENTS

| | | | |
|---|---|---|---|
| 2,882,244 | 4/1959 | Milton | 423/DIG. 21 X |
| 2,979,381 | 4/1961 | Gottstine et al. | 423/DIG. 21 X |
| 3,013,986 | 12/1961 | Castor | 502/79 |
| 3,777,006 | 12/1973 | Rundell et al. | 423/709 |
| 3,789,107 | 1/1974 | Elliott, Jr. | 423/DIG. 21 X |
| 3,808,326 | 4/1974 | McDaniel | 423/329 |
| 3,949,059 | 4/1976 | Elliott, Jr. | 423/DIG. 21 X |
| 4,007,253 | 2/1977 | Puppe et al. | 423/769 |
| 4,081,514 | 3/1978 | Sand et al. | 423/709 |
| 4,340,573 | 7/1982 | Vaughan et al. | 423/DIG. 21 X |
| 4,400,366 | 8/1983 | Sanders | 423/329 |
| 4,436,708 | 3/1984 | Sanders | 423/DIG. 21 X |
| 4,482,530 | 11/1984 | Sanders et al. | 423/709 |
| 4,526,878 | 7/1985 | Takegami et al. | 502/65 |
| 4,678,651 | 7/1987 | Miyazaki et al. | 423/DIG. 21 X |
| 4,714,601 | 12/1987 | Vaughan | 502/79 X |

FOREIGN PATENT DOCUMENTS 1050476 12/1966 United Kingdom ....... 423/DIG. 21
1097860 3/1988 United Kingdom .

*Primary Examiner*—Mark L. Bell
*Assistant Examiner*—David Sample
*Attorney, Agent, or Firm*—Nikaido, Marmelstein, Murray & Oram

[57] ABSTRACT

Sodium type X zeolite crystals of a particle size of 50 μm or more are grown from seed crystals at a rate of about 5 μm per day in a mother liquor having an approximate composition 0.94 $Na_2O$, 0.011 $Al_2O_3$, and 0.200 $SiO_2$ mol/kg by adding a fine silica powder, a somewhat coarser alumina powder, and sodium hydroxide from time to time. The addition rates are such as to maintain the mother liquor at a super-saturation level of less than 20% with respect to the alumina to avoid the formation of a gel. Throughout the growing period the mother liquor is stirred and maintained at a temperature of about 95°C.

6 Claims, No Drawings

GROWING SODIUM TYPE X ZEOLITE CRYSTALS

TECHNICAL FIELD

This invention relates to the growing of crystals of sodium type X zeolite, an alumino-silicate compound having molecular porosity. Sodium type X zeolite has the chemical formula $Na_2O.Al_2O_3.2.5SiO_2$. It is usually referred to by the abbreviation NaX. When found as a naturally occurring mineral it is known as Faujasite.

NaX crystals are used in a variety of industrial and chemical processes, including use as a regenerative desiccant, that is to say a desiccant which may be used to absorb moisture from a gas until saturated, and may thereafter be heated to drive off the absorbed water to render the desiccant fit for re-use. The present invention was devised with the use of the crystals as the desiccant medium of a parallel plate dehumidifier in mind, and is described primarily in that context hereinafter, but it will be understood that crystals grown in accordance with the invention are not limited to that use.

BACKGROUND ART

Hitherto, NaX crystals have been produced commercially by a hydrogel process resulting in crystals ranging in particle size from 1 to 5 μm. In applications requiring NaX particles of larger size it has been usual to agglomerate the hydrogel crystals into pellets held together by an inorganic adhesive.

DISCLOSURE OF THE INVENTION

In parallel plate dehumidifiers, the desiccant medium is applied as a layer to each side of the substrate "plates" (frequently a plastics film ribbon). In the case of a crystalline medium it is preferable for each crystal to be exposed to the gas to be dried. This calls for a single thickness layer of crystals, which means that agglomerated pellets are not suitable. It is also preferable for there to be a substantial amount of medium in each layer, which means that very small crystals are not suitable. These factors point to a need for commercial quantities of relatively large NaX crystals. The present invention aims to fulfil that need.

The invention consists in a method of growing crystals of sodium type X zeolite comprising the steps of preparing a super-saturated mother liquor, being an aqueous solution of sodium, aluminium and silicon wherein the ratio of the respective concentrations of aluminium to silicon is less than that corresponding to the molar proportions of those elements in sodium type X zeolite, maintaining the mother liquor at an elevated temperature, adding small seed crystals of sodium type X zeolite to the mother liquor, adding feed materials contributing further sodium, aluminium and silicon to the solution at a rate to maintain a degree, of super-saturation below that at which an amorphous gel of the zeolite would form at that temperature and provide for the elements in the growing crystals, and extracting larger crystals of sodium type X zeolite grown upon said seed crystals.

The method may be effected continuously using a continuous crystalliser with fractionation, or it may be effected as a single or multi-stage batch process.

BEST MODE OF CARRYING OUT THE INVENTION

By way of example, an embodiment of the above described invention is described in more detail hereinafter.

A mother liquor of approximate composition 0.94 $Na_2O$, 0.011 $Al_2O_3$, and 0.200 $SiO_2$ mol/kg is prepared and maintained at about 90° to 100° C. in a plastics container resistant to alkaline solutions.

The seed crystals are then added to the container following which the solution is continuously stirred.

Feed materials are added at a pre-determined rate to ensure the solution is super-saturated but to a degree less than 20% in respect of the alumina, so that a gel will not form. Those feed materials may comprise powdered silica, powdered alumina and sodium hydroxide.

One suitable silica powder which is presently commercially available is sold as 400 grit silica. It is high purity, while, crystalline silica, having a typical analysis of 99.0% $SiO_2$, 0.03% $Fe_2O_3$ and an ignition loss of 0.2%. The particle size may range from 3 to 30 μm.

One suitable alumina powder which is presently commercially available is sold as smelter grade calcined alumina. It is high melting point aluminium oxide in the alpha phase from, having a typical analysis as follows

| | |
|---|---|
| $Al_2O_3$ | 98.7–99.3% |
| $SiO_2$ | 0.02–0.04% |
| $Fe_2O_3$ | 0.01–0.04% |
| $Na_2O$ | 0.40–0.70% |
| Loss on ignition (1200° C.) | 0.25–1.00% |
| Total water | 2.0–3.0% | and a screen analysis as follows

| | |
|---|---|
| on 100 mesh | 0–10% |
| on 200 mesh | 55–85% |
| on 325 mesh | 75–95% |
| through 325 mesh | 5–25% |

The sodium hydroxide may be any commercially available substantially pure product.

It should be noted that the alumina is coarser than the silica. This substantially compensates for their differing solubilities in the alkaline mother liquor, to the extent that they may be added thereto simultaneously without substantially altering their relative concentrations in the solution. It should also be noted that the addition of the silica and alumina in the form of solids having low solubility enables them to be added as discrete doses at timed intervals without producing sudden changes in the composition of the solution. This greatly facilitates the control of the degree of super-saturation and the rate of growth of the zeolite crystals which is preferably not more than 5 μm per day.

However in other embodiments, possibly presenting more control problems insofar as the feed rates are concerned, the make up materials may be in other forms and may comprise any other appropriate chemicals, for example the sodium and the silicon may be fed in as water glass, that is a viscous liquid sodium silicate.

Typically the preferred feed materials mentioned above (powdered silica, powdered alumina and sodium hydroxide) may be added two to four times per day over a period of say five to ten days to produce NaX crystals of about 50 to 100 μm. particle size. The optimum size for use as the desiccant of a parallel plate dehumidifier is substantially 50 μm. The quantity of feed material added in each instance is preferably increased as time progresses to compensate for the greater rate of take up as the growing crystals increase in surface area.

At the end of the batch operation's growing period the NaX crystals may be harvested by filtering them from the solution in conventional manner. They may then be washed and dried to make them suitable for application as a desiccant to the supporting substrate of a parallel plate gas dehumidifier.

Alternatively, and preferably, the first growing period may be reduced and the crystals harvested when they have attained a particle size of about 20 μm. Those newly harvested crystals may then be divided into parcels and each parcel used as the seed crystals in respect of subsequent batch operations. This two stage process permits more efficient use of reaction vessels smaller than a vessel able to accommodate the full growth of all of the original seed crystals.

We claim:

1. A method of growing cyrstals of sodium X zeolite comprising the steps of:

preparing a supersaturated mother liquor, which is an aqueous solution of sodium, aluminum and silicon having a ratio of proportions of these elements such that the ratio of aluminum to silicon is less than that which corresponds to the molar proportions of these elements in sodium X zeolite;

maintaining said mother liquor at an elevated temperature;

adding seed crystals of sodium X zeolite to said mother liquor;

adding feed materials, comprising sodium, powdered alumina and powdered silica, to said mother liquor in an amount and at a rate sufficient to maintain the supersaturation of said mother liquor at said elevated temperature below that at which an amorphous gel of said zeolite would otherwise form;

growing additional material of the crystal structure of sodium X zeolite on said seeds to thereby form larger crystals of sodium X zeolite; and extracting from said mother liquor crystals of sodium X zeolite which are larger than said seeds.

2. The method of claims in claim 1 wherein said alumina is powdered calcined alumina.

3. The method as claimed in claim 2 wherein said alumina powder is sufficiently coarser than said silica powder to cause the rates of dissolution of said powders in said mother liquor to be substantially equal.

4. The method ad claimed in claim 1 wherein said elevated temperature is about 9020 to 100° C.

5. The method as claimed in claim 1 wherein said feed materials are added to said mother liquor at rates such that the rate of growth of said crystals is about 5 μm per day.

6. The method as claimed in claim 5 carried out batchwise for about 5 days under conditions sufficient to produce crystals having a size of about 50 μm.

* * * * *

UNITED STATES PATENT AND TRADEMARK OFFICE
CERTIFICATE OF CORRECTION

PATENT NO. : 5,370,859
DATED : December 6, 1994
INVENTOR(S) : Maclaine Cross

It is certified that error appears in the above-indentified patent and that said Letters Patent is hereby corrected as shown below:

Title page, item [22], delete "1990" and substitute therefor --1991--.

Signed and Sealed this

Twenty-fourth Day of October, 1995

Attest:

BRUCE LEHMAN

*Attesting Officer*    *Commissioner of Patents and Trademarks*